United States Patent Office 2,898,330
Patented Aug. 4, 1959

2,898,330
NOVEL CATALYST FOR THE POLYMERIZATION OF ETHYLENE

Hrant Isbenjian, Brooklyn, N.Y., assignor to Aries Associates, Incorporated, Stamford, Conn., a corporation of New York No Drawing. Application January 10, 1957
Serial No. 633,383

11 Claims. (Cl. 260—94.9)

The present invention relates to the polymerization of ethylene to high molecular weight polymers by means of a novel catalyst. More particularly it relates to the preparation of linear polyethylene by means of a stable, inexpensive aluminum chloride catalyst.

Heretofore, in the preparation of linear polyethylene there have been employed catalysts comprising complexes of aluminum alkyls and various promoters or activators. These catalysts besides being expensive, have suffered from the shortcoming that they are extremely sensitive to air and moisture and require storage and use with special precautions to maintain their activity.

In accordance with the present invention I have found that commercial aluminum halides such as the chloride or bromide are catalytically active for the polymerization of olefins when complexed with one-fifth to one-fifteenth the molar amount of tetravalent lead or tin alkyls, aryls, aralkyls and/or alkaryls.

If desired, one of the four valences of the lead or tin can be combined with a halogen atom usch as chlorine or bromine while the three remaining valences are attached to hydrocarbon radicals such as methyl, ethyl, benzyl, phenyl, tolyl, and the like.

The catalyst can be prepared by contacting the components in an inert organic solvent such as a liquid hydrocarbon, halogenated hydrocarbon or the like. The catalyst, because of its stability, can be stored safely even for comparatively long periods of time or can be employed directly for the preparation of polymers and copolymers. The monomer is introduced into the solvent and polymerization proceeds even at room temperature, although somewhat elevated temperatures are preferred because of the higher rate of polymerization obtained at these slightly elevated temperatures. If the olefin being polymerized is gaseous at the prevailing temperature, a slight pressure can be employed to increase the total amount of monomer dissolved in the solvent. In any case moderate increase in pressure serves the useful function of decreasing the size of the equipment needed and increasing the rate of polymerization. The course of the reaction can then be followed since the pressure will fall as the monomer is polymerized.

The following examples illustrate preparation of the novel catalyst and the polymerization of ethylene in accordance with the present invention:

Example 1

(a) To a clean stainless steel autoclave 3 liters of heptane containing 15 grams of technical grade aluminum bromide were added and the solution was agitated, then 2.3 grams of triphenyl tin chloride were added with vigorous agitation. The solution was then warmed to 60° C. and charged with ethylene to a pressure of 100 pounds per square inch gage. The pressure began to drop immediately and the temperature began to rise. The temperature was controlled as close to 60° C. as possible by cooling and was not allowed to rise above 65° C. When the pressure dropped to 10 pounds per square inch gage the autoclave was recharged with ethylene to 100 pounds per square inch gage and the repressuring was repeated whenever the pressure dropped to 15 pounds per square inch gage. After absorption of about 650 grams of ethylene the addition of ethylene was stopped, the charge cooled to room temperature and the excess gas vented. The catalyst was then decomposed by adding 1 liter of methanol, the autoclave opened, and the material filtered.

(b) The separated material was washed with three 500 cc. portions of methanolic hydrogen chloride, then repeatedly with pure methanol until the filtrate was free from chlorides and the product was dried in vacuum at 50° C. over night. The yield was 150 grams of a white powder having an ash content of less than 0.01% and a density of 0.95. The product is a linear polymer of high melting point and considerable strength.

Example 2

The process of Example 1 was repeated substituting one-half the amount of technical grade aluminum chloride for the bromide and replacing the triphenyl tin chloride by the equimolar amount of tetraethyl lead. Substantially identical results were achieved.

Example 3

1.6 grams of commercial technical grade aluminum chloride were dissolved in 500 cc. of cyclohexane under a nitrogen blanket in a one liter flask provided with a mercury-sealed stirrer, an ethylene gas inlet, and a vent gas outlet. The solution was agitated and then 0.8 gram of triphenyl lead bromide was added and the solution was stirred for one hour. The solution was then warmed to 60° C. and ethylene bubbled in a ordinary pressure. Since the temperature rose during the reaction, heating was discontinued. After 8 hours 200 cc. of methanol were added, the contents of the flask were stirred for several minutes with cooling, and the cooled slurry was filtered. Purification by the technique of Example 1 produced 40 grams of high molecular weight linear polyethylene.

Example 4

15 grams of technical grade aluminum bromide are dissolved in 2 liters of benzene in a pressure vessel and 2.5 grams of tetraphenyl tin are stirred in. Ethylene is bubbled in under 80 p.s.i.g. and 80° C. and the pressure maintained until 500 grams are adsorbed. Purification by the process of Example 1 produces 242 grams of polyethylene of the same properties as in Example 1.

What is claimed is:

1. The process which comprises polymerizing ethylene in a suspension in an inert organic solvent of a complex of a commercial aluminum halide selected from the group consisting of aluminum chloride and aluminum bromide with from about one-fifth to one-fifteenth the molar amount of a metal compound selected from the group consisting of tetrahydrocarbon tin, tetrahydrocarbon lead, trihydrocarbon tin halide and trihydrocarbon lead halide, said hydrocarbon being selected from the group consisting of alkyl, aryl, aralkyl, and alkaryl hydrocarbons.

2. A catalyst for polymerizing olefins comprising the complex of a commercal aluminum halide selected from the group consisting of aluminum chloride and aluminum bromide with a metal compound selected from the group consisting of tetrahydrocarbon tin, tetrahydrocarbon lead, trihydrocarbon tin halide and trihydrocarbon lead halide, said hydrocarbon being selected from the group consisting of alkyl, aryl, aralkyl, and alkaryl hydrocarbons.

3. A catalyst according to claim 2, wherein the metal compound is present in an amount ranging from about one-fifth to one-fifteenth the molar amount of the aluminum halide.

4. A catalyst according to claim 2, wherein the aluminum halide is technical commercial aluminum chloride.

5. A catalyst according to claim 2, wherein the aluminum halide is technical commercial aluminum bromide.

6. A catalyst for polymerizing olefins comprising the complex of a commercial aluminum halide selected from the group consisting of aluminum chloride and aluminum bromide with from about one-fifth to one-fifteenth the molar amount of tetra-hydrocarbon lead, said hydrocarbon being selected from the group consisting of alkyl, aryl, aralkyl, and alkaryl hydrocarbons.

7. A catalyst for polymerizing olefins comprising the complex of a commercial aluminum halide selected from the group consisting of aluminum chloride and aluminum bromide with from about one-fifth to one-fifteenth the molar amount of tetra-hydrocarbon tin, said hydrocarbon being selected from the group consisting of alkyl, aryl, aralkyl, and alkaryl hydrocarbons.

8. A catalyst for polymerizing olefins comprising the complex of a commercial aluminum halide selected from the group consisting of aluminum chloride and aluminum bromide with from about one-fifth to one-fifteenth the molar amount of tri-hydrocarbon lead halide, said hydrocarbon being selected from the group consisting of alkyl, aryl, aralkyl, and alkaryl hydrocarbons.

9. A catalyst for polymerizing olefins comprising the complex of a commercial aluminum halide selected from the group consisting of aluminum chloride and aluminum bromide with from about one-fifth to one-fifteenth the molar amount of tri-hydrocarbon tin halide, said hydrocarbon being selected from the group consisting of alkyl, aryl, aralkyl, and alkaryl hydrocarbons.

10. A catalyst for polymerizing ethylene comprising the complex of commercial aluminum chloride with from about one-fifth to one-fifteenth the molar amount of tetraphenyl tin.

11. A catalyst for polymerizing ethylene comprising the complex of commercial aluminum chloride with from about one-fifth to one-fifteenth the molar amount of tetraethyl lead.

References Cited in the file of this patent

UNITED STATES PATENTS 2,786,035     Freimiller et al. _____ Mar. 19, 1957

OTHER REFERENCES

Skoldinov et al.: C.A. 37, 3064 (1943).

"Anhydrous Aluminum Chloride in Organic Chemistry" (C. A. Thomas). Published by Reinhold Publishing Corporation (New York), 1941 (pages 786–787 relied on). Copy in Scientific Library.

Notice of Adverse Decision in Interference

In Interference No. 91,759 involving Patent No. 2,898,330, H. Isbenjian, Novel catalyst for the polymerization of ethylene, final judgment adverse to the patentee was rendered Feb. 27, 1964, as to claims 1, 2, 3, 4, 5, 7, 9 and 10.
[*Official Gazette August 25, 1964.*]